United States Patent [19]
Fetty

[11] Patent Number: 5,588,752
[45] Date of Patent: Dec. 31, 1996

[54] BEARING AND JOURNAL ASSEMBLY

[75] Inventor: Mark W. K. Fetty, Hopewell, Va.

[73] Assignee: Brenco, Incorporated, Petersburg, Va.

[21] Appl. No.: 610,304

[22] Filed: Mar. 4, 1996

[51] Int. Cl.$^6$ ............................................. F16C 33/78
[52] U.S. Cl. ................................ 384/477; 384/484
[58] Field of Search .......................... 384/477, 484, 384/571, 551, 584, 148

[56]      References Cited
U.S. PATENT DOCUMENTS

| | | |
|---|---|---|
| 2,981,547 | 4/1961 | McNicoll . |
| 4,819,949 | 4/1989 | Otto .................................... 277/29 |
| 5,017,025 | 5/1991 | Williams ............................. 384/584 |
| 5,380,102 | 1/1995 | Sink .................................... 384/484 |
| 5,462,367 | 10/1995 | Davidson et al. .................. 384/459 |

Primary Examiner—Lenard A. Footland
Attorney, Agent, or Firm—Edward J. Kondracki; James L. Bean; Kerkam, Stowell, Kondracki & Clarke, P.C.

[57]          ABSTRACT

An improved double row tapered bearing assembly for use on rail cars employs a shortened journal in combination with a seal wear ring having an inner surface in interference fitting relation with the journal and an outer surface having a diameter at least equal to the mean diameter of the inner raceways. The wear ring and backing ring cooperate to provide an increased journal and bearing assembly section modulus and rigidity to thereby reduce flexing and the consequent journal fretting and component end face wear.

12 Claims, 3 Drawing Sheets

BEARING AND JOURNAL ASSEMBLY

BACKGROUND OF THE INVENTION

1. Field of the Invention

This invention relates to antifriction bearings and more particularly to an improved compact antifriction bearing and journal which cooperate to reduce journal flexing and both journal and bearing end face fretting wear during operation.

2. Description of the Prior Art

Sealed two row tapered roller bearing assemblies preassembled into a self-contained, prelubricated package for mounting onto journals at the ends of axles or shafts are well known. Such bearing assemblies are widely used, for example, as rail car bearings mounted onto journals at the ends of rail car axles, and the present invention will be described with reference to such rail car bearings, if being understood that the bearings may be employed on shaft journals for various uses. In bearings of this type, the two rows of tapered rollers are fitted one into the outer tapered race at each end of a common bearing cup for cooperation with a pair of bearing cones defining the inner races and having an inner diameter dimensioned to provide an interference fit with the shaft journal, with a cylindrical sleeve or spacer positioned between the cones to provide accurate spacing and bearing loading. Seals mounted within each end of the bearing cup provide contact with annular wear rings abutting against the outer ends of the respective bearing cones and retain the component parts in assembled relationship so that the entire structure can be pressed as a unit onto the end of the journal.

In the past, it has been considered critical that the seal wear ring interface be kept as small as practically possible in order to minimize the torque required to turn one component relative to the other and to minimize the interface relative speed. Reducing the diameter of the wear ring contact surface reduced the leverage of the frictional resistance and also reduced both the total contact area and the relative circumferential speed between the seal and wear ring contact area. While highly efficient low torque seals now available have reduced the advantages realized from this design consideration, the minimum diameter wear rings have continued to be used.

In a typical rail car installation, the axle journal is machined with a fillet at its inboard end, and a backing ring machined to accurately fit the contour of the fillet along at least a substantial portion of the axial length of the fillet engages and positions the inboard end of the wear ring and thereby accurately locates the bearing on the journal. An end cap mounted on the end of the axle by cap screws threaded into bores in the axle engages the outboard wear ring and applies an axial compressive load to the assembly between the fillet and the end cap and a corresponding axial tensile load to the journal.

Since an interference fit is provided between the inner surfaces of the wear rings and bearing cones and the outer surface of the axle journal, the bearing assembly must be installed on the journal by a pressing operation. Sufficient load is applied during this operation to provide a predetermined seating force against the backing ring and fillet, and upon removal of the seating force, a residual load is maintained in the bearing stack as a result of the interference fit. The end cap is then installed to apply a predetermined clamping force to the outboard end of the bearing assembly so that the compressive load is theoretically maintained during the dynamic loading conditions in service.

The journal is the smallest diameter portion of a rail car axle, and bending loads applied through the bearing to the outwardly extending, or cantilevered journal tends to cause flexing of the journal particularly under the dynamic loading of a fast moving, heavily loaded rail car. As explained in U.S. Pat. No. 5,380,102, the cantilevered loading of the rotating journal results in dynamic flexing, i.e., the journal is always bent downward as it rotates. This flexing produces a stress in the journal which typically is at a maximum at a location just slightly axially inboard of the smallest diameter portion of the fillet, or at about the location of the axially inboard end of the conventional inner wear ring.

Flexing of the journal, particularly where adequate clamping force of the bearing is not achieved or maintained, will result in the bearing experiencing face wear between adjacent components, especially on the side of the bearing nearest the wheel where journal stresses are greatest. Under conditions of high dynamic loading, flexure can result in bearing components moving vertically relative to each other or separating on the side of the journal under tension. Fretting may also occur between the journal outer surface and the bearing cones, or the wear rings, particularly in the area where the axially inner cone face and wear ring abut. This fretting can ultimately lead to costly journal repairs or even axle replacement.

Numerous attempts have been made to reduce journal flexing and thereby damage due to fretting. For example, in U.S. Pat. No. 5,462,367, the length of the journal is reduced by eliminating the conventional wear rings and thereby reducing the bending moment on the journal. In this patent, the inner bearing cones are extended axially to provide cylindrical sealing surfaces and radial abutment faces which abut directly against the end cap and against the face of the backing ring at substantially the smallest diameter portion of the fillet. The bearing cones are undercut in this extended portion and this is alleged to reduce fretting between the inner cone and the journal surface at this high stress location. While the shortened lever arm of the resultant load inherently reduces journal flexure, and thereby presumably reduces fretting, this bearing design may present additional problems. For example, the inner races of this bearing are not interchangeable with the millions of rail car bearings currently in use so that interchangeability of parts is not possible. Further, the bearing seal, extending directly between the bearing cup in the relatively large diameter extended portion of the bearing cones, provides a lubricant reservoir at the ends of the rolling elements which is extremely small and may be difficult to seal. The tapered rollers, particularly at high speed, inherently act as a pump tending to force lubricant from the central portion of the bearing cavity outwardly to the sealed end portions from which the lubricant must migrate back toward the central portion of the cavity. The reduced reservoir at the outer ends of the bearings can thus result in excessive pressure build up, and seal leakage and may result in improper bearing lubrication. Also, the abutment faces between the inboard bearing cone and the backing ring is located substantially at the point of maximum stress. This can result in end face fretting which, in time, can relieve bearing stack preload.

SUMMARY OF THE INVENTION

In accordance with the present invention, journal flexing and bearing end face and journal fretting are reduced by employing a shortened bearing axle journal in combination with a shortened wear ring having increased thickness and stiffness, with the axially inner end of the wear ring contacting an abutment face on the backing ring at a location axially inboard of the maximum journal stress, preferably approximately midway of the axial length of the journal fillet. The same wear ring is preferably employed on both ends of the bearing so as to be interchangeable. A pair of lubricant seals having rigid cases mounted one on each end of the bearing cup present resilient sealing elements in rubbing contact with the outer surface of the wear rings to seal the bearing in the conventional manner, with the seals providing a lubricant reservoir at each end of the bearing with sufficient volume to facilitate lubricant circulation during operation.

The outer diameter of the enlarged seal wear rings is preferably at least equal to the mean diameter of the bearing cone race surface, and the inner diameter of the wear rings is dimensioned to provide an interference fit with the journal outer surface. This interference fit preferably extends from about one fourth to about one half of the axial length of the wear rings. The increased diameter and interference fit cooperate to effectively increase the section modulus and rigidity of the bearing and journal assembly. This increased radial thickness of the wear rings also provides an increased face contact surface between the inner wear ring and inner cone which not only increases the rigidity of the assembly but also reduces the unit load between the cone and wear ring and thereby reduces fretting. Thus, the advantages of a shorter axle journal are achieved without sacrificing advantages of the conventional bearing design structure utilizing wear rings for contacting the bearing seals while moving the contact area between the backing ring and wear ring to a stiffer location to thereby further enhance the rigidity of the assembly.

In an alternate embodiment of the invention, the backing ring and inner wear ring are formed as an integral structure. This configuration provides greater rigidity by eliminating any possible relative movement between the wear ring and backing ring. Preferably, a wear ring of equal diameter is employed on the outer end of the assembly to enable interchangeability of the seals used.

BRIEF DESCRIPTION OF THE DRAWINGS

Other features and advantages of the invention will be apparent from the detailed description contained hereinbelow, taken in conjunction with the drawings, in which.

DESCRIPTION OF THE PREFERRED EMBODIMENTS

Figure 2:
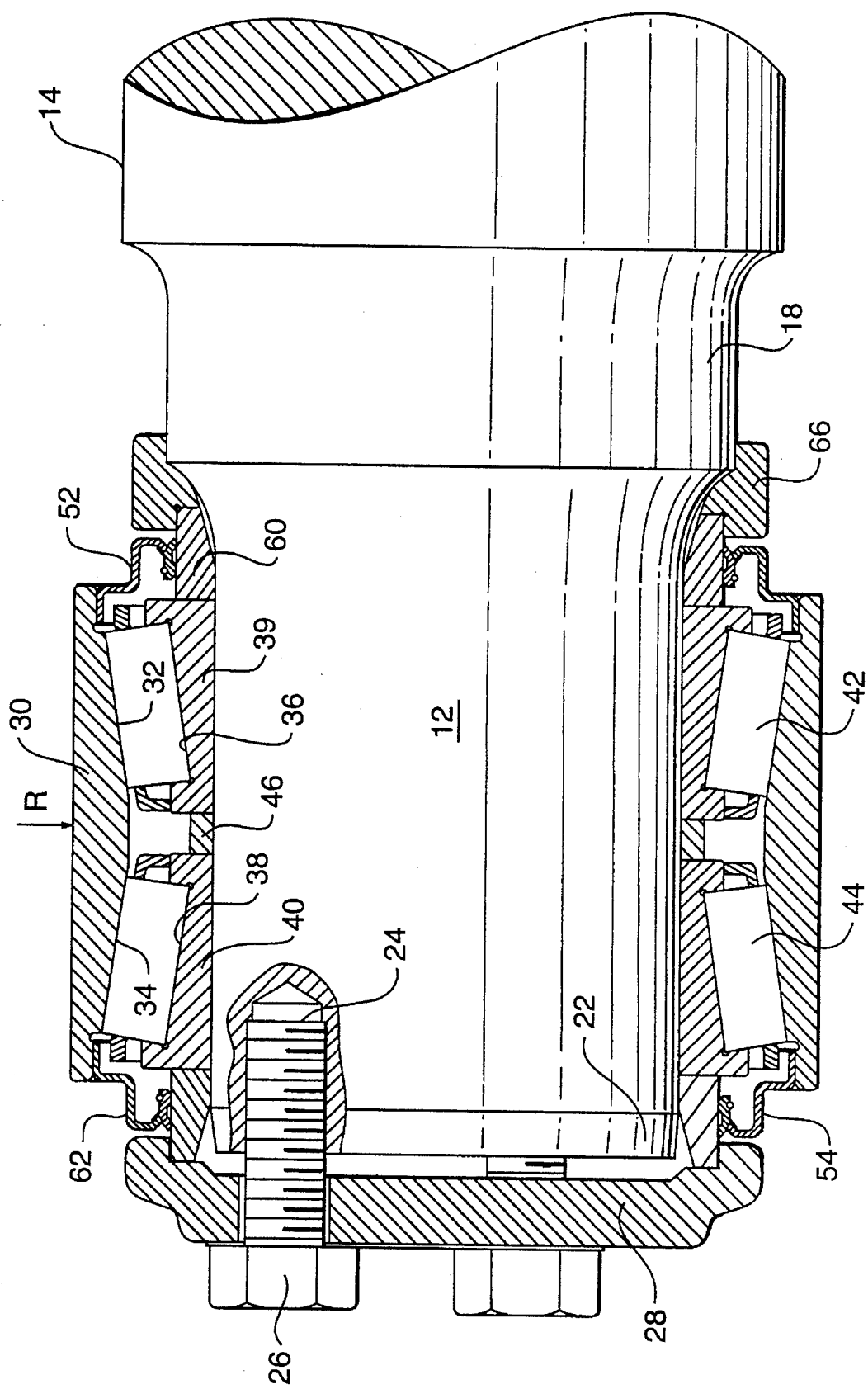
FIG. 2 is a view similar to FIG. 1 and showing a bearing and rail car axle journal assembly according to the present invention.
Figure 3:
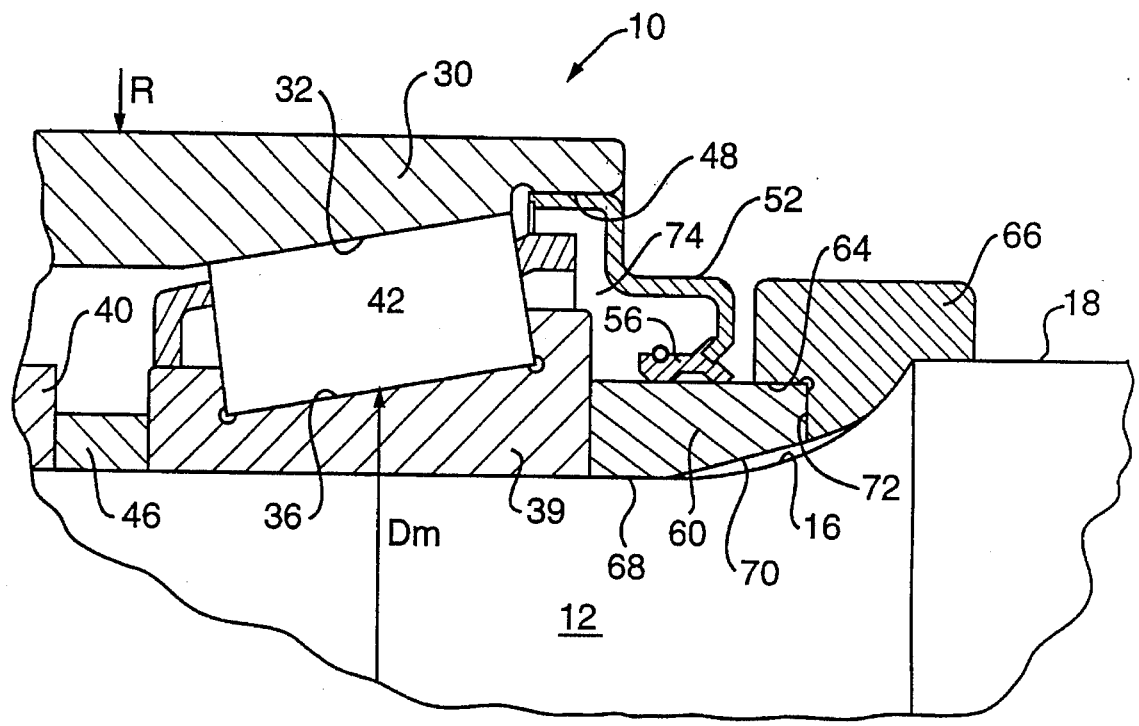
FIG. 3 is an enlarged fragmentary view showing a portion of the structure in FIG. 2.

Referring now to the drawings in detail, a bearing and journal assembly according to a preferred embodiment of the present invention is illustrated in FIGS. 2 and 3 and includes an antifriction bearing assembly 10 mounted on a journal 12 formed on the free or cantilevered end of a rail car axle 14. Journal 12 terminates at its inner end in a chamfered fillet 16 leading to a cylindrical shoulder portion 18 which, in turn, is joined by fillet 20 to the main body of axle 14. At its opposite or free end, the journal 12 terminates in a slightly conical or tapered guide portion 22 to facilitate installation of the bearing assembly. A plurality of threaded bores 24 are formed in the end of axle 14 for receiving threaded cap screws or bolts 26 for mounting a retaining cap 28 on the end of the axle to clamp the bearing in position for operation.

The bearing assembly 10 includes a unitary bearing cup 30 having a pair of raceways 32, 34 formed one adjacent each end thereof which cooperate with a pair of opposed, outwardly directed inner bearing raceways 36, 38 formed on bearing cones 39, 40, respectively, to support two rows of tapered roller bearings 42, 44, respectively, and a center spacer 46 is positioned between cones 39, 40 to maintain the inner bearing races in accurately spaced relation relative to one another.

The bearing cup 30 is provided with cylindrical counterbores, indicated at 48 in FIG. 3, at its opposed ends outboard of the outer raceways 32, 34 and a pair of identical seal assemblies 52, 54 are pressed one into each of the cylindrical counterbores. Seals 52, 54 include resilient sealing elements, indicated at 56 in FIG. 3, which rub upon and form a seal with a pair of seal wear rings 60, 62, respectively, having their inwardly directed ends in engagement with the outwardly directed ends of bearing cones 38, 40, respectively. The other end of wear ring 60 is received in a cylindrical counterbore 64 in the axially outwardly directed end of an annular backing ring 66 which, in turn, has a counterbore 68 at its other end which is dimensioned to be received in interference relation on the cylindrical shoulder 18 of shaft 14. The counterbore 64 and the outer diameter of the wear ring 60 are dimensioned to provide an interference fit so that the wear ring may be pressed into and retained in concentric relation with the backing ring. The backing ring 66 is accurately machined to provide a convex inner surface complementary to and engaging the concave contour of fillet 16 when the bearing assembly is mounted on shaft 14.

The bearing assembly 10 is mounted and seated on the journal 12 by applying an axial force to the axially outwardly directed end face of the outboard wear ring 62 to overcome the interference fit between the journal 12 and all of the components in the stack to firmly seat the assembly against the fillet 16. When the bearing is properly seated, the load is removed and the end cap 28 is installed by accurately torquing the bolts 26 to apply and maintain a compressive load to the bearing stack between the end cap and the fillet 16.

Figure 1:
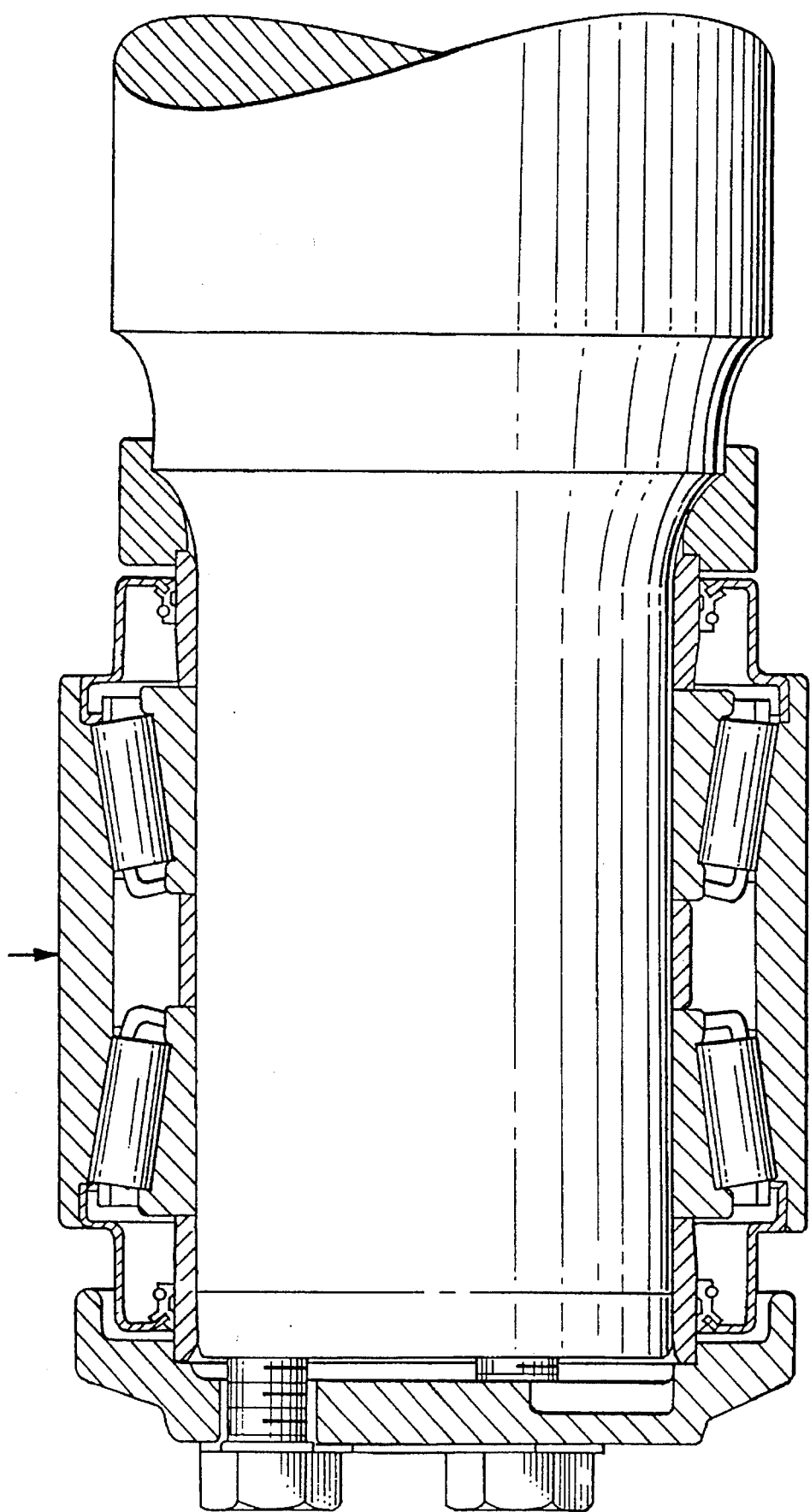
FIG. 1 is a sectional view of a prior art bearing filed to the journal of a rail car axle.

It will be apparent that the description thus far applies equally to the prior art bearing and journal assembly of FIG. 1 and to the present invention shown in FIGS. 2 and 3. It is also acknowledged that numerous variations of certain components of such bearing assemblies have been used in the prior art, and modifications continue to be made in an effort to reduce bearing component face wear and journal fretting. While these prior efforts, as well as continued improvements in sealing materials and lubricants, have been effective in improving journal and bearing performance, both bearing component face wear and journal fretting continue to affect overall bearing service life. The improved bearing and journal assembly of the present invention substantially reduces journal flexure and consequently reduces component face wear and fretting without adversely effecting bearing lubrication and sealing in operation.

As is apparent from a comparison of FIGS. 1 and 2, the journal 12 of the present invention is substantially shorter than that of the conventional rail car axle journal. At the same time, the resultant load indicated by the arrow R in FIG. 2 is applied to the bearing assembly 10 by the rail car side frame through a conventional adapter at the same distance from the rail car's vertical centerplane as in the standard bearing and journal. Since the overall length of the axle 14 is essentially fixed, the shortened journal is made possible by increasing the length of the shoulder portion 18, thereby positioning the fillet 16 closer to the end of the axle. Alternatively, the shoulder length may remain unchanged and the larger central body portion of axle 14 may be longer. Shortening of the journal relative to the standard or prior art journal inherently produces a stiffer bearing support thereby reducing flexing in operation. Such a reduced length journal is shown, for example, in U.S. Pat. No. 5,462,367, and the advantages of the shorter journal and the resultant increase in rigidity are explained in that patent. The shortened journal 12 also necessarily requires a shortened overall length of the bearing assembly 10, as compared with the standard rail car bearing. In accordance with the present invention, a substantial shortening of the bearing assembly is achieved by reducing the axial length of the central spacer 46, with a corresponding reduction in length of the cup 30 between outer races 32, 34.

In accordance with the present invention, additional journal stiffening and reduced flexing are achieved by the novel structure of the inner wear ring 60 and of the backing ring 66. Referring particularly to FIG. 3, it is seen that the wear ring 60 has an inner generally cylindrical surface portion 68 and a tapered, inner surface portion 70 extending from portion 68 to its axially inner end. Portion 68 is dimensioned to contact and provide an interference fit with the outer surface of journal 12 from its axially outer end to a point adjacent the minimum diameter portion of fillet 16. Further, wear ring 60 has an outer diameter which is at least equal to the mean diameter Dm and preferably no greater than about the maximum diameter of the inner race 36 of cone 39. It has been found that the use of a wear ring having a diameter substantially greater than the maximum inner race diameter can produce excessive seal resistance and may require substantial change in existing seal manufacturing procedures, thereby substantially increasing the cost of the assembly.

Preferably outer wear ring 62 is identical to wear ring 60 so that the wear rings and seals at both ends of the bearing are interchangeable, although it is apparent that a conventional or smaller diameter outer wear ring and compatible seal could be used. Similarly, cones 39 and 40 are preferably identical and preferably are of conventional construction so as to be interchangeable with cones on current commercial bearings.

Although the surface 68 of wear ring 60 is described as being generally cylindrical, it is preferred that the end portion of this surface adjacent the end face which abuts the cone 39 be curved at a relatively large radius to provide a smooth contour attenuating the edge stress in the area contacting the end face of cones 39 and the cylindrical surface of journal 12. A similar large radius curvature may be employed at the juncture of surface 68 and 70. It should be understood, however, that the surface 68 is in contact with journal 12 throughout the major portion of its length.

The end surfaces of wear ring 60 lie in parallel planes perpendicular to the axis of the journal, with the axially inner end surface engaging the abutment surface 72 defined by counterbore 64 in backing ring 66 at an axial location substantially equal distance between the maximum and minimum diameter portions of the fillet 16.

The axially outer end of wear ring 60 is in abutting relation with the axially inner end of cone 39 so that, upon installation of the bearing under appropriate seating forces and the application clamping forces by the end cap 28, wear ring 60 is under an axial compressive load between the abutment face 72 of backing ring 66 and the axially inner end face of cone 39. It is apparent that this compressive load, in combination with the increased radial thickness of the wear ring 60 in contact with the cone 39 and the interference fit between the journal 12 and inner surface 68 materially increases section modulus of the assembly in this high stress area and thereby increases the flexural strength of the journal. Further, the increased diameter of the wear ring and abutment face 72, and the location of the abutment face 72 in an area of increased journal diameter, i.e., along the fillet 16 where the axle is inherently stiffer, contributes to this overall increase in stiffness. At the same time, the outer cylindrical surface of the wear ring 60 provides a contact surface for the resilient sealing element 56 of seal 52 at a location sufficiently spaced axially from the rollers 42 to provide a reservoir 74 for lubricant pumped from the central portion of the bearing during operation, permitting the lubricant to be temporarily retained and to migrate back between the rolls without producing excessive pressure which could cause leakage from the seal.

The reduced journal flexure resulting from a combination of the shortened journal and the increased stiffness produced by the wear ring dimensioned to be press fit onto the journal and having an external diameter effective in producing a substantial increase in bending resistance substantially eliminates journal fretting in the area adjacent the abutment of the bearing cone 39 and wear ring 60. This reduction in flexure also substantially eliminates component face wear so that the compressive load in the bearing stack between the fillet 16 and the end cap 28 is retained even after extended periods of operation.

Figure 4:
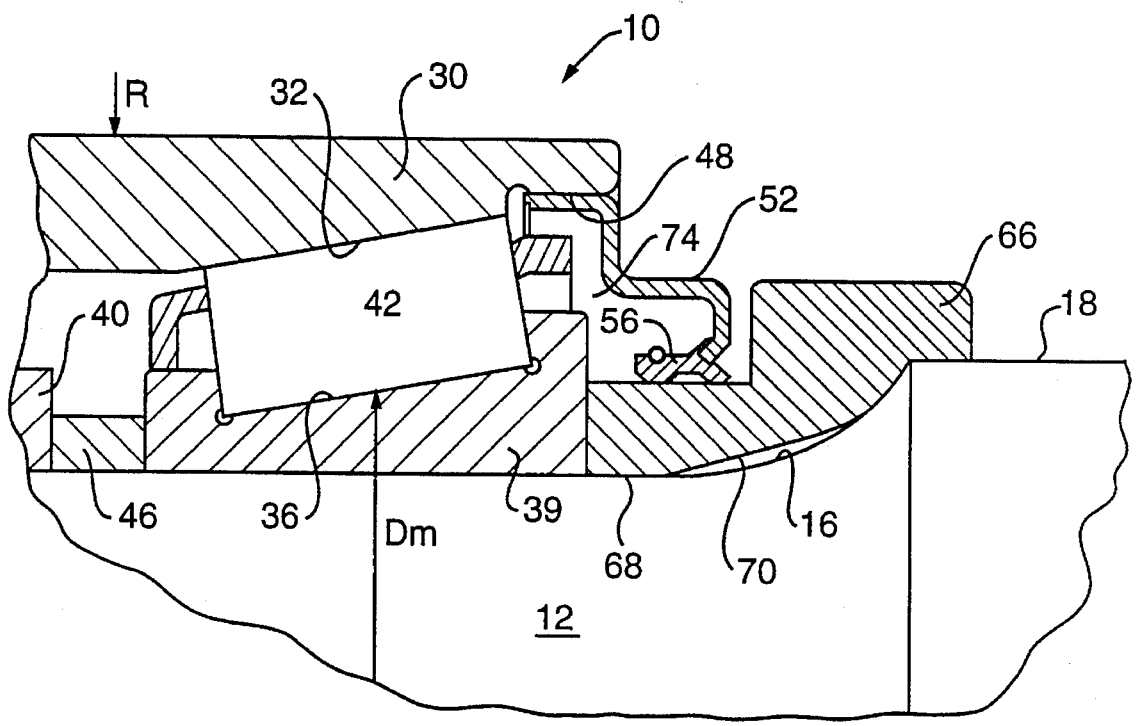
FIG. 4 is a view similar to FIG. 3 showing an alternate embodiment of the invention.

Referring now to FIG. 4, an alternate embodiment of the invention is shown where an integrally formed combined backing ring and inner wear ring 80 is employed in place of the backing ring 66 and inner wear ring 60. All other elements and their function of this embodiment may be identical to the structure just described with respect to FIGS. 2 and 3, and like reference numerals are employed in FIG. 4 to designate these components. In this embodiment, even further flexural rigidity is achieved by the elimination of the abutting faces and interference fit between the backing ring and wear ring. All other advantages of the embodiment of FIGS. 2 and 3 are achieved in this embodiment and need not be repeated.

The improved bearing according to the present invention preferably will be used to replace existing bearings as new cars are put in service, or as new wheels and axles are replaced on existing rolling stock. Integration of the bearing and journal assembly into existing rail systems may be accomplished with a minimum of retooling required, however, since the diameter of the axle 14, shoulder 18 and journal 12, and the curvature of the fillets 16 and 20, preferably will conform to existing AAR Standards. Existing tooling for producing and reworking journals may be employed with standard or conventional bearing assemblies as well as the improved journal and bearing assembly according to the present invention. Similarly, bearing cones 39, 40 may be identical to those used in conventional AAR approved bearings and the tooling for producing the bearing cups, seals and the like may be used equally with either standard bearing assemblies or with the assembly of the present invention. Thus, interchangeability of major components of the present bearing assembly with millions of bearings in service on rail cars may be achieved.

While preferred embodiments of the invention have been disclosed and described, it should be apparent that the invention is not so limited, but rather it is intended to include all embodiments which would be apparent to one skilled in the art and which come within the spirit and scope of the invention.

What is claimed:

1. In combination with a rail car axle having a coaxial, cylindrical journal portion at and extending inwardly from a free end of the axle and a coaxial, cylindrical shoulder portion spaced from the free end and having a diameter larger than the diameter of the journal, and a fillet merging the cylindrical journal surface into the shoulder, an improved bearing assembly fitted onto the journal and retained thereon by an end cap mounted on said free end to permit relative rotation between the axle and an element supported by the bearing, said bearing assembly comprising, an inboard bearing cone and an outboard bearing cone mounted on said journal in axially spaced relation to one another, each said cone defining frustoconical inner raceway and each having an inner diameter providing an interference fit with said journal, a cylindrical spacer element mounted on said journal between said bearing cones and maintaining said bearing cones in said axially spaced relation, a bearing cup defining a pair of inwardly directed frustoconical outer raceways located one in radially outwardly spaced relation to each of said inner raceways, rolling elements located between the outer and inner raceways, a backing ring mounted on said shoulder, said backing ring having a counterbore formed therein providing an interference fit with said cylindrical shoulder surface and a contoured surface complementary to and engaging said fillet surface over a portion of the axial extent of said fillet in a manner to radially and axially fix the backing ring on the axle, a second counterbore formed in said backing ring providing an annular, substantially planar axially outwardly directed abutment surface at an axial location spaced between the maximum and minimum diameter portions of said fillet, a first seal wear ring mounted on said journal and having a first end surface engaging said backing ring abutment surface and a second end surface engaging said inboard bearing cone, a second seal wear ring mounted in contact with said outboard bearing cone and said end cap, and a pair of annular sealing elements interposed one between each end of said bearing cup and each said seal wear ring forming a lubricant barrier at each end of the bearing, said first seal wear ring having an inner generally cylindrical surface providing an interference fit with said cylindrical journal surface over a portion of the axial length of said first seal wear ring and having an outer cylindrical surface providing an interference fit with said second cylindrical bore in said backing ring, said outer cylindrical surface of said first seal wear ring having a diameter at least equal to the mean diameter of said inner raceways.

2. The combination defined in claim 1 wherein said outer cylindrical surface of said first seal wear ring has a diameter no greater than the maximum diameter of said frustoconical inner raceways.

3. The combination defined in claim 2 wherein said inner generally cylindrical surface of said first seal wear ring has an axial length between one fourth and one half the axial length of the seal wear ring.

4. The combination defined in claim 3 wherein said axially outwardly directed abutment surface is located at an axial position substantially equal distant from said maximum and minimum diameter portions of said fillet.

5. The combination defined in claim 4 wherein said generally cylindrical inner surface of said first seal wear ring terminates at each end thereof in a smoothly curved outwardly flared surface portion at each end.

6. In combination with a rail car axle having a coaxial, cylindrical journal portion at and extending inwardly from a free end of the axle and a coaxial, cylindrical shoulder portion spaced from the free end and having a diameter larger than the diameter of the journal, and a fillet having a minimum diameter equal to the diameter of the journal and a maximum diameter spaced axially from said minimum diameter and merging the cylindrical journal surface into the shoulder, an improved bearing assembly fitted onto the journal and retained thereon by an end cap mounted on said free end to permit relative rotation between the axle and an element supported by the bearing, said bearing assembly comprising, an inboard bearing cone and an outboard bearing cone mounted on said journal in axially spaced relation to one another, each said cone defining an outwardly directed frustoconical inner raceway and each having an inner diameter providing an interference fit with said journal cylindrical surface, a cylindrical spacer element mounted on said journal between said bearing cones and maintaining said bearing cones in said axially spaced relation, a bearing cup defining a pair of inwardly directed frustoconical outer raceways located one in radially outwardly spaced relation to each of said inner raceways, rolling elements located between the outer and inner raceways, a backing ring mounted on said shoulder, said backing ring having a counterbore formed therein providing an interference fit with said cylindrical shoulder surface and a contoured surface complementary to and engaging said fillet surface over a portion of the axle extent of said fillet in a manner to radially and axially fix the backing ring on the axle, said backing ring having an axially extending seal wear ring portion integrally formed thereon, said seal wear ring portion having a cylindrical outer surface and terminating in an axially outwardly directed abutment surface engaging said inboard bearing cone, a seal wear ring mounted in contact with said outboard bearing cone and said end cap, a first annular sealing element interposed between the inboard end of said bearing cup and said wear ring portion and a second annular sealing element interposed between said bearing cup and said seal wear ring forming a lubricant barrier at each end of the bearing, said wear ring portion of said backing ring having an inner generally cylindrical surface providing in interference fit with said cylindrical journal portion over a portion of the axial length of said wear ring portion, said outer cylindrical surface of said wear ring portion having a diameter at least equal to the mean diameter of said inner raceways.

7. The combination defined in claim 6 wherein said outer cylindrical surface of said seal wear ring portion has a diameter no greater than the maximum diameter of said inner raceways.

8. The combination as defined in claim 7 wherein said inner generally cylindrical surface of said first seal wear ring portion has an axial length between one fourth and one half the axial length of the seal wear ring portion.

9. The combination as defined in claim 8 wherein said generally cylindrical inner surface of said first seal wear ring portion terminates at each end thereof in a smoothly curved outwardly flared surface portion.

10. In combination with a rail car axle having a coaxial, cylindrical journal portion at and extending inwardly from a free end of the axle and a coaxial, cylindrical shoulder portion spaced from the free end and having a diameter larger than the diameter of the journal, and a fillet merging the cylindrical journal surface into the shoulder, an improved bearing assembly fitted onto the journal and retained thereon by an end cap mounted on said free end to permit relative rotation between the axle and an element supported by the bearing, said bearing assembly comprising, an inboard bearing cone and an outboard bearing cone mounted on said journal in axially spaced relation to one another, each said cone defining frustoconical inner raceway and each having an inner diameter providing an interference fit with said journal, a cylindrical spacer element mounted on said journal between said bearing cones and maintaining said bearing cones in said axially spaced relation, a bearing cup defining a pair of inwardly directed frustoconical outer raceways located one in radially outwardly spaced relation to each of said inner raceways, rolling elements located between the outer and inner raceways, a backing ring mounted on said shoulder, said backing ring having a counterbore formed therein providing an interference fit with said cylindrical shoulder surface and a contoured surface complementary to and engaging said fillet surface over a portion only of the axial extent of said fillet in a manner to radially and axially fix the backing ring on the axle, first seal wear ring means extending between said backing ring and having an end surface engaging said inboard bearing cone, an outboard seal wear ring mounted in contact with said outboard bearing cone and said end cap, and a pair of annular sealing elements interposed one between each said bearing cup and said seal wear ring means and one between said bearing cup and said outboard seal wear ring forming a lubricant barrier at each end of the bearing, said seal wear ring means having an inner generally cylindrical surface providing an interference fit with said cylindrical journal surface over a portion only of the axial length of said seal wear ring means and having an outer cylindrical surface having a diameter at least equal to the mean diameter of said inner raceways.

11. The combination defined in claim 10 wherein said first seal wear ring means is integrally formed with said backing ring.

12. The combination defined in claim 10 wherein said first seal wear ring means is a separate ring interposed between said backing ring and said inboard bearing cone.

* * * * *